United States Patent
Zhou et al.

(10) Patent No.: US 11,468,602 B2
(45) Date of Patent: Oct. 11, 2022

(54) IMAGE ENCODING METHOD AND APPARATUS AND IMAGE DECODING METHOD AND APPARATUS

(71) Applicant: FUJITSU LIMITED, Kawasaki (JP)

(72) Inventors: Jing Zhou, Beijing (CN); Sihan Wen, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 401 days.

(21) Appl. No.: 16/750,409

(22) Filed: Jan. 23, 2020

(65) Prior Publication Data

US 2020/0327701 A1 Oct. 15, 2020

(30) Foreign Application Priority Data

Apr. 11, 2019 (CN) .......................... 201910289189.3

(51) Int. Cl.
  *G06T 9/00* (2006.01)
  *G06N 20/20* (2019.01)
  *G06N 3/08* (2006.01)
  *G06N 7/00* (2006.01)
  *G06T 3/40* (2006.01)
  *H04N 19/91* (2014.01)
  *G06N 3/04* (2006.01)

(52) U.S. Cl.
  CPC ........... *G06T 9/002* (2013.01); *G06N 3/0454* (2013.01); *G06N 3/08* (2013.01); *G06N 7/005* (2013.01); *G06N 20/20* (2019.01); *G06T 3/4046* (2013.01); *H04N 19/91* (2014.11)

(58) Field of Classification Search
CPC . G06T 9/00; G06T 9/02; H04N 19/91; G06N 3/0454
See application file for complete search history.

(56) References Cited

U.S. PATENT DOCUMENTS 10,713,794 B1 7/2020 He et al.
2011/0285557 A1 11/2011 Korodi et al.
(Continued)

FOREIGN PATENT DOCUMENTS

CN 102396229 A 3/2012
CN 102939719 A 2/2013
(Continued)

OTHER PUBLICATIONS

Zhou et al "Multi-Scale Context Adaptive Entropy Model for Image Compression" arXiv:1910.07844 Oct. 17, 2019 (Year: 2019).*
(Continued)

*Primary Examiner* — Sean T Motsinger
(74) *Attorney, Agent, or Firm* — Staas & Halsey LLP

(57) ABSTRACT

Embodiments of this disclosure provide an image encoding method and apparatus and image decoding method and apparatus. The image encoding includes performing convolutional neural network (CNN) encoding on image data to generate feature vectors or feature maps; quantizing the feature vectors or feature maps to generate discrete symbols to be encoded; and estimating probabilities of the symbols to be encoded by using a multi-scale context model including multiple mask convolution layers of different scales. An entropy encoding of the image data is performed according to the probabilities of the symbols to be encoded.

10 Claims, 11 Drawing Sheets

(56) References Cited

U.S. PATENT DOCUMENTS

| | | | |
|---|---|---|---|
| 2012/0045141 A1 | 2/2012 | Suzuki et al. | |
| 2012/0057799 A1 | 3/2012 | Nguyen et al. | |
| 2013/0315300 A1 | 11/2013 | Lee et al. | |
| 2017/0295381 A1 | 10/2017 | Choi et al. | |
| 2019/0122073 A1 | 4/2019 | Ozdemir et al. | |
| 2019/0171871 A1 | 6/2019 | Zhang et al. | |
| 2019/0172223 A1 | 6/2019 | Vajda et al. | |
| 2019/0172224 A1 | 6/2019 | Vajda et al. | |
| 2020/0092556 A1 | 3/2020 | Coelho et al. | |
| 2020/0160565 A1* | 5/2020 | Ma | G06N 3/0481 |
| 2020/0304802 A1 | 9/2020 | Habibian et al. | |
| 2020/0314430 A1 | 10/2020 | Lasserre et al. | |
| 2020/0327701 A1* | 10/2020 | Zhou | G06T 3/4046 |
| 2020/0329233 A1 | 10/2020 | Nemirofsky | |
| 2020/0372686 A1* | 11/2020 | Wen | H04N 19/172 |

FOREIGN PATENT DOCUMENTS

| | | |
|---|---|---|
| CN | 103430541 A | 12/2013 |
| CN | 107481295 A | 12/2017 |
| CN | 107644426 A | 1/2018 |
| CN | 109565596 A | 4/2019 |

OTHER PUBLICATIONS

Final Office Action dated May 14, 2021 in U.S. Appl. No. 16/855,465 (21 pages).

First Notification of Office Action dated Dec. 6, 2021 in corresponding Chinese Patent Application No. 201910429351.7 (4 pages) (7 pages English Translation).

Search Report dated Dec. 6, 2021 in corresponding Chinese Patent Application No. 201910429351.7 (2 pages) (2 pages English Translation).

U.S. Appl. No. 62/821,778, filed Mar. 21, 2019, Qualcomm Inc.

Yi Wei et al.; "Quantization Mimic: Towards Very Tiny CNN for Object Detection"; Tsinghua University, Beijing, China; Computer Vision Foundation; ECCV 2018; (17 pages).

Non-Final Office Action dated Jan. 29, 2021 in U.S. Appl. No. 16/855,465 (14 pages).

Aaron van den Cord et al.; "Conditional Image Generation with PixelCNN Decoders"; arXiv:1606.05328v2 [cs.CV]; Jun. 18, 2016; (13 pages).

Jooyoung Lee et al.; "Context-Adaptive Entropy Model for End-to-End Optimized Image Compression"; arXIV:1809.10452v3 [eess.IV] Nov. 19, 2018; (20 pages).

First Notification of Office Action dated Dec. 14, 2021 in corresponding Chinese Patent Application No. 201910289189.3 (5 pages) (7 pages English Translation).

Search Report dated Dec. 14, 2021 in corresponding Chinese Patent Application No. 201910289189.3 (4 pages) (4 pages English Translation).

U.S. Appl. No. 16/855,465, filed Apr. 22, 2020, Jing Zhou, Fujitsu Limited Kawasaki-shi, JP.

Jing Zhou et al: "Multi-scale and Context-adaptive Entropy Model for Image Compression", arxiv.org, Cornell University Library, 201 Olin Library Cornell University Ithaca, NY 14853, Oct. 17, 2019 (4 pages).

David Minnen et al: "Joint Autoregressive and Hierarchical Priors for Learned Image Compression", arxiv.org, Cornell University Library, 201 Olin Library Cornell University Ithaca, NY 14853, Sep. 8, 2018, X P888914979 (22 pages).

Johannes Balle et al: "Variational image compression with a scale hyperprior", May 1, 2018, XP055632204 (23 pages).

Siwei Ma et al: "Image and Video Compression with Neural Networks: A Review", arxiv.org, Cornell University Library, 201 Olin Library Cornell University Ithaca, NY 14853, Apr. 7, 2019, XP881165996 (16 pages).

Extended European Search Report dated Jun. 24, 2020 in related European Patent Application No. 20151116.9 (7 pages).

Dong Jie, et al., "Adaptive binary arithmetic coding based on context: A new entropy coding technique for video compression"; Zhejiang University, Digital TV & Digital Video, China Academic Journal Electronic Publishing House, Paper ID: 1002-8692 (2003) 08-0009-03.

\* cited by examiner

IMAGE ENCODING METHOD AND APPARATUS AND IMAGE DECODING METHOD AND APPARATUS

CROSS-REFERENCE TO RELATED APPLICATIONS

This application is based on and hereby claims priority under 35 USC 119 to Chinese Patent Application No. 201910289189.3, filed Apr. 11, 2019, in the China National Intellectual Property Administration, the entire contents of which are incorporated herein by reference.

TECHNICAL FIELD

This disclosure relates to the field of image processing, and in particular to an image encoding method and apparatus and image decoding method and apparatus.

BACKGROUND

With development of computer technology, application of images has become more and more extensive. In order to efficiently store and transmit image files, image compression of image files is needed. Image compression may be seen as a tradeoff between code rate and a degree of image compression distortion. According to Shannon's source coding theorem, a theoretical limit of data compression is information entropy. In other words, if entropy of image data may be accurately estimated, the image data may be denoted by using relatively few bits or a relatively small code rate, thereby achieving rate-distortion balance.

According to information theory, information entropy of a symbol $\hat{y}$ to be encoded may be calculated according to formula 1:

$$H(\hat{y}) = -E_{\hat{y} \sim p}[\log p(\hat{y})] = -\Sigma p(\hat{y}) \log p(\hat{y}) \quad \text{(formula 1)};$$

where, $\hat{y}$ is the symbol to be encoded, and $p(\hat{y})$ is a probability of the symbol to be encoded.

It can be seen that in order to calculate the information entropy of the symbol to be encoded, it is needed to determine the probability of the symbol to be encoded first. However, in normal situations, the probability of the symbol to be encoded is not known, and therefore, the probability of the symbol to be encoded needs to be estimated. Assuming that the estimated probability of the symbol to be encoded is $\tilde{p}(\hat{y})$, the estimated information entropy may be calculated according to formula 2:

$$\tilde{H}(\hat{y}) = -E_{\hat{y} \sim \tilde{p}}[\log \tilde{p}(\hat{y})] = -\Sigma \tilde{p}(\hat{y}) \log \tilde{p}(\hat{y}) \quad \text{(formula 2)}.$$

Since there may be a deviation between the estimated probability $\tilde{p}(\hat{y})$ of the symbol to be encoded and an actual probability $p(\hat{y})$, the estimated information entropy $\tilde{H}(\hat{y})$ is usually larger than the actual information entropy $H(\hat{y})$. It can be seen that if the probability of the symbol to be encoded may be accurately estimated, the image data may be denoted by using relatively few bits or a relatively small code rate, thereby facilitating improvement of a compression efficiency of the image data.

At present, deep neural networks have been gradually applied to the field of image compression technology and have achieved good performance. Autoregressive models (such as Pixel Recurrent Neural Networks (Pixel-RNNs), Pixel Convolutional Neural Networks (Pixel-CNNs)) may enable pixel data of images to form feature sequences, and use convolution operations to predict condition probability distribution of each pixel relative to preceding pixels. Moreover, in the lossy image compression technology, a context model is also introduced for performing image encoding efficiently.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the prior art, when estimating a conditional probability of the latent representation of image data, a single-scale context model is usually employed. It was found by the inventors that when performing image encoding by using the condition probability estimated in the above method, it is still necessary to denote image data by using relatively more bits, and rate-distortion balance cannot be achieved.

Embodiments of this disclosure provide an image encoding method and apparatus and image decoding method and apparatus, in which by estimating probabilities of symbols to be encoded by using a multi-scale context model, accuracy of probability estimation of the symbols to be encoded may be improved, and by performing entropy encoding on the symbols to be encoded according to the probabilities, the image data may be denoted by using relatively few bits, thereby improving encoding efficiency of the image encoding.

According to a first aspect of the embodiments of this disclosure, there is provided an image encoding apparatus, including: a convolutional neural network encoder configured to encode image data to be processed by using a convolutional neural network to generate feature vectors or feature maps of the image data; a quantizer configured to quantize the feature vectors or feature maps to generate discrete symbols to be encoded; a probability estimator configured to estimate probabilities of the symbols to be encoded by using a multi-scale context model; wherein the probability estimator comprises multiple mask convolution layers of different scales; and an entropy encoder configured to perform entropy encoding according to the probabilities of the symbols to be encoded.

According to a second aspect of the embodiments of this disclosure, there is provided an image decoding apparatus, including: a probability estimator configured to estimate probabilities of symbols to be decoded currently by using a multi-scale context model; wherein the probability estimator comprises multiple mask convolution layers of different scales; an entropy decoder configured to perform entropy decoding on the symbols to be decoded according to the probabilities to obtain feature vectors or feature maps; and a convolutional neural network decoder configured to decode the feature vectors or the feature maps to generate image data.

According to a third aspect of the embodiments of this disclosure, there is provided an image encoding method, including: performing convolutional neural network encoding on image data to be processed to generate feature vectors or feature maps of the image data; quantizing the feature vectors or feature maps to generate discrete symbols to be encoded; estimating probabilities of the symbols to be encoded by using a multi-scale context model; wherein the multi-scale context model comprises multiple mask convolution layers of different scales; and performing entropy encoding according to the probabilities of the symbols to be encoded.

According to a fourth aspect of the embodiments of this disclosure, there is provided an image decoding method, including: estimating probabilities of symbols to be decoded currently by using a multi-scale context model; wherein the multi-scale context model comprises multiple mask convolution layers of different scales; performing entropy decoding on the symbols to be decoded according to the probabilities to obtain feature vectors or feature maps; and performing convolutional neural network decoding on the feature vectors or the feature maps to generate image data.

An advantage of the embodiments of this disclosure exists in that by estimating probabilities of symbols to be encoded by using a multi-scale context model, accuracy of probability estimation of the symbols to be encoded may be improved, and by performing entropy encoding on the symbols to be encoded according to the probabilities, the image data may be denoted by using relatively few bits, thereby improving encoding efficiency of the image encoding.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

These and further aspects and features of the present disclosure will be apparent with reference to the following description and attached drawings. These embodiments are illustrative only, and are not intended to limit this disclosure. Particular embodiments of this disclosure shall be described below with reference to the accompanying drawings.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, exemplary explanations shall be given by taking a Convolutional Neural Network (CNN) as an example; however, this disclosure is not limited thereto. Reference may be made to related techniques for basic concept and contents of the CNN.

Embodiment 1

Figure 1:
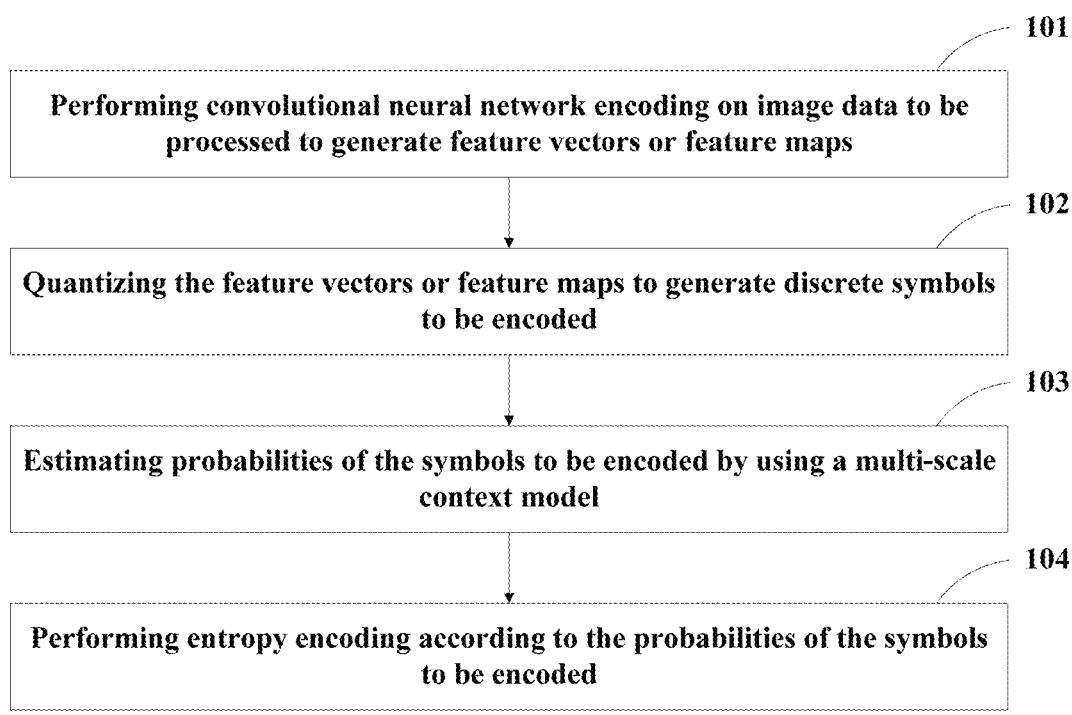
FIG. 1 is a schematic diagram of the image encoding method of Embodiment 1.

Embodiment 1 provides an image encoding method. FIG. 1 is a schematic diagram of the image encoding method of this embodiment. As shown in FIG. 1, the method includes:

step 101: performing convolutional neural network encoding on image data to be processed to generate feature vectors or feature maps;

step 102: quantizing the feature vectors or feature maps to generate discrete symbols to be encoded;

step 103: estimating probabilities of the symbols to be encoded by using a multi-scale context model; the multi-scale context model includes multiple mask convolution layers of different scales; and step 104: performing entropy encoding according to the probabilities of the symbols to be encoded.

In an embodiment, by estimating probabilities of symbols to be encoded by using a multi-scale context model, accuracy of probability estimation of the symbols to be encoded may be improved, and by performing entropy encoding on the symbols to be encoded according to the probabilities, the image data may be denoted by using relatively few bits, thereby improving encoding efficiency of the image encoding.

In an embodiment, in step 101, the Convolutional Neural Networks (CNNs) are a type of Feedforward Neural Networks including convolution calculation and having deep structures, which are one of representative algorithms of deep learning. By encoding the image data to be processed by the convolutional neural networks, feature vectors or feature maps to which the image data correspond may be obtained.

In an embodiment, in step 102, the feature vectors or feature maps obtained by the convolutional neural network encoding are in a form of analog data. By quantizing the feature vectors or the feature maps in the form of analog data, feature vectors or feature maps in a discrete form may be obtained. The feature vectors or feature maps in the discrete form are the symbols to be encoded. In an embodiment, the quantization of the feature vectors or the feature maps may be performed by using any quantization method, which is not limited in this disclosure.

In an embodiment, in step 103, in estimating the probabilities by using the multi-scale context model, the estimation may be performed in a point-by-point manner according to an order of the symbols to be encoded; the estimated probabilities of the symbols to be encoded are dependent on information on encoded symbols preceding the symbols to be encoded.

In an embodiment, in step 103, the multi-scale context model may be of any structure. For example, the multi-scale context model may include multiple mask convolution layers of different scales. The mask convolution layers may be used to perform convolution operations on multiple symbols taking a symbol to be encoded as a center, a weight of the encoded symbols preceding the symbols to be encoded may be set to be 1, and a weight of un-encoded symbols following the symbols to be encoded may be set to be 0.

A method for estimating the probabilities of the symbols to be encoded by using multiple mask convolution layers of different scales shall be described below with reference to FIGS. 2 and 3A-3C.

Figure 2:
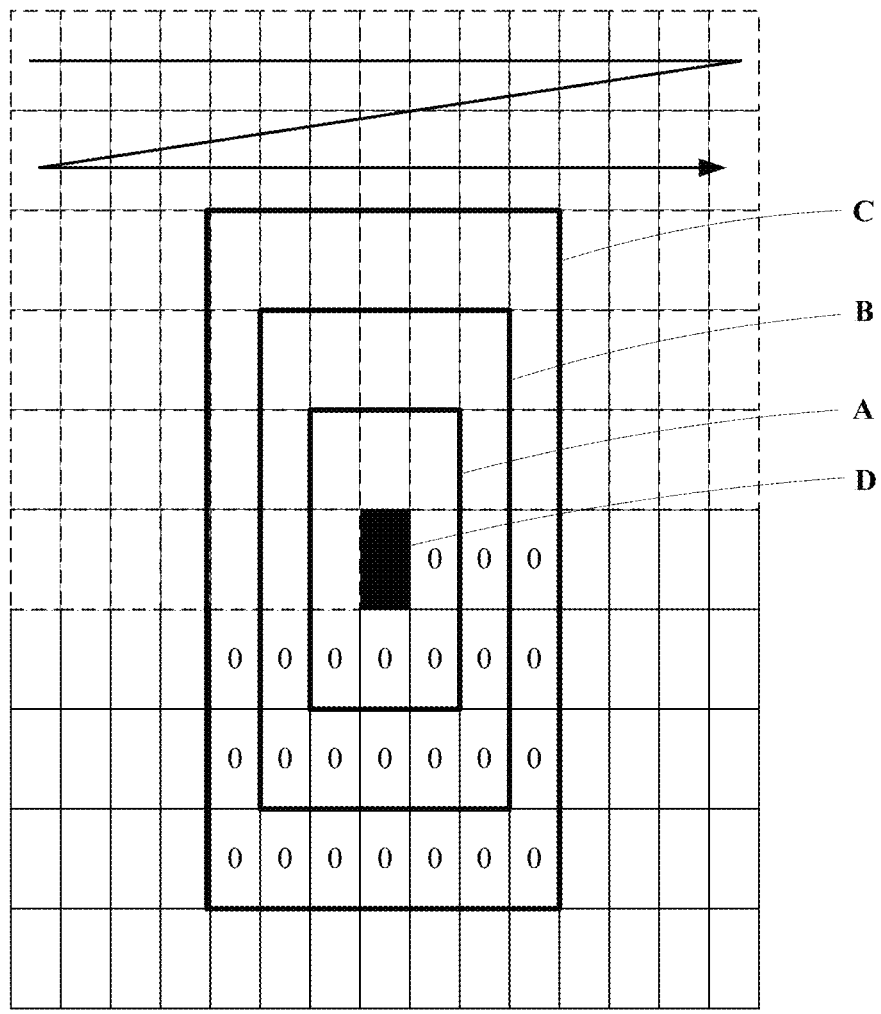
FIG. 2 is a schematic diagram of a feature map of Embodiment 1.

FIG. 2 is a schematic diagram of a feature map of an embodiment. For the convenience of description, a feature map of 15*10 is exemplarily used in FIG. 2. However, it may be understood that the feature map may also be of other sizes, which is not limited in this disclosure. As shown in FIG. 2, in the feature map, each rectangle denotes a discrete symbol to be encoded, the rectangle in dotted lines corresponds to an encoded symbol, the rectangle D corresponds to a current symbol to be encoded needing to be estimated with respect to probability, and probability estimation is performed on the symbols to be encoded one by one in a direction indicated by the arrow.

Figure 3A:
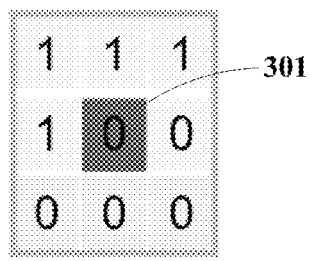
FIG. 3A is a schematic diagram of a mask convolution layer of Embodiment 1.
Figure 3B:
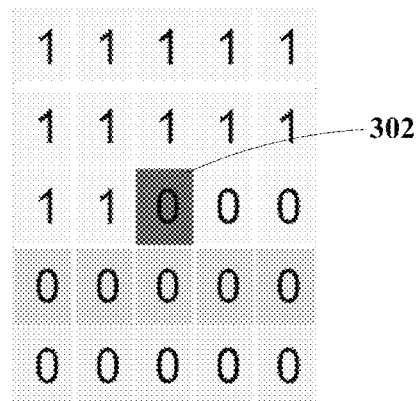
FIG. 3B is another schematic diagram of the mask convolution layer of Embodiment 1.
Figure 3C:
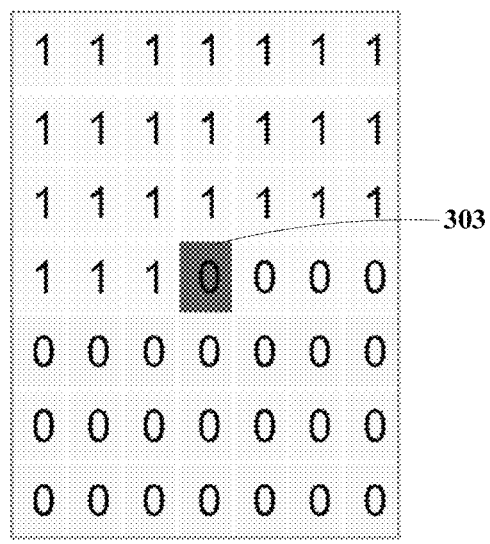
FIG. 3C is a further schematic diagram of the mask convolution layer of Embodiment 1.

In an embodiment, any number of mask convolution layers of different scales may be used in the multi-scale context model; the scales of the mask convolution layers may be any scales. FIGS. 3A-3C are schematic diagrams of multiple mask convolution layers of different scales of the embodiments.

In an embodiment, as shown in FIGS. 3A-3C, three mask convolution layers of different scales may be used in the multi-scale context model. The scales of the mask convolution layers may be 3*3, 5*5 and 7*7, respectively. The 3*3 mask convolution layer shown in FIG. 3A corresponds to the rectangle A in FIG. 2, the 5*5 mask convolution layer shown in FIG. 3B corresponds to the rectangle B in FIG. 2, and the 7*7 mask convolutional layer shown in FIG. 3C corresponds to the rectangle C in FIG. 2. The rectangle 301 in FIG. 3A, the rectangle 302 in FIG. 3B and the rectangle 303 in FIG. 3C correspond to the rectangle D in FIG. 2, i.e. the current symbol to be encoded.

As shown in FIGS. 2 and 3A-3C, as the probability of the symbol to be encoded is dependent on the information of the encoded symbols preceding the symbol to be encoded, a weight of the encoded symbols preceding the symbol to be encoded may be set to be 1, and a weight of the un-encoded symbols following the symbol to be encoded may be set to be 0, and the probability of the symbol to be encoded is calculated according to formula 3:

$$\tilde{p}(\hat{y}) = \pi_{i=1}^{m} \tilde{p}(\hat{y}_i | \hat{y}_{i-1}, \ldots, \hat{y}_0) \quad \text{(formula 3)};$$

where, $\tilde{p}(\hat{y})$ is an estimated probability of a symbol to be encoded, $\tilde{p}(\hat{y}_i | \hat{y}_{i-1}, \ldots, \hat{y}_0)$ is a condition probability of a symbol $\hat{y}_i$ relative to preceding symbols $\hat{y}_0, \ldots, \hat{y}_{i-1}$, and m is the number of the preceding symbols, which is related to the scales of the mask convolution layers. For example, when a scale of a mask convolution layer is 3*3, m=4; when a scale of a mask convolution layer is 5*5, m=12; and when a scale of a mask convolution layer is 7*7, m=24.

In an embodiment, the probability of the current symbol to be encoded is estimated according to the preceding encoded symbols, that is, the correlation between the preceding encoded symbols and the symbol to be encoded needs to be taken into account in estimating the probability of the current symbol to be encoded. The correlation between the preceding encoded symbols and the current symbol to be encoded may possibly be different due to different image data or different regions in the same image data. Therefore, in the embodiments of this disclosure, by providing multiple mask convolution layers of different scales, not only the preceding encoded symbols relatively far away from the current symbol to be encoded but also the preceding encoded symbols relatively close to the current symbol to be encoded may be taken into account. Thus, the preceding information may be fully utilized, thereby accurately estimating the probabilities of the symbols to be encoded.

In an embodiment, in step 103, in estimating the probabilities of the symbols to be encoded by using the multi-scale context model, the probability estimation may be performed according to the operation results of the multiple mask convolution layers of different scales, or the probability estimation may be performed according to the operation results of the multiple mask convolution layers of different scales and side information. Step 103 shall be exemplarily described below with reference to FIGS. 4 and 5.

Figure 4:
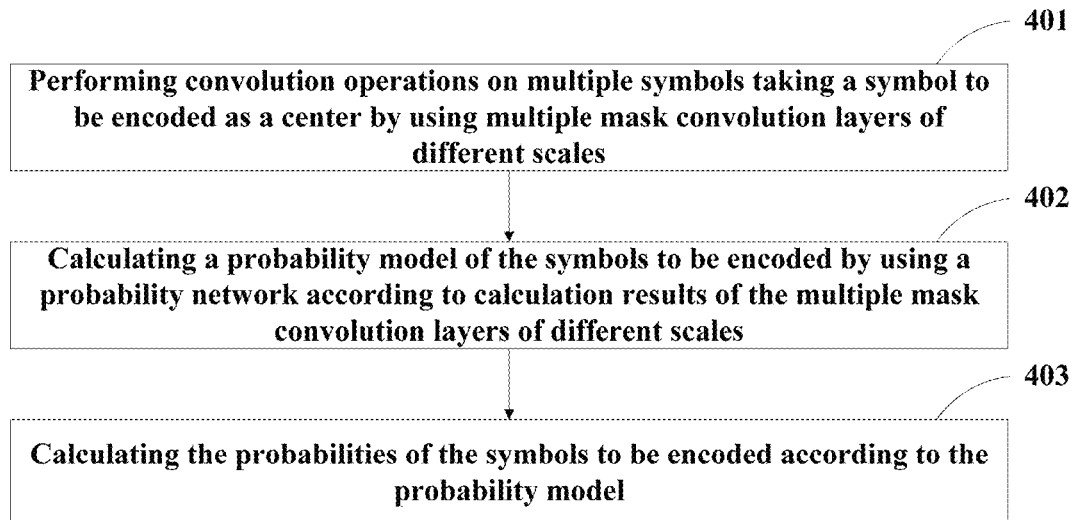
FIG. 4 is a schematic diagram of a method for estimating probabilities of symbols to be encoded of Embodiment 1.

FIG. 4 is a schematic diagram of a method for estimating probabilities of symbols to be encoded of an embodiment. As shown in FIG. 4, the method includes:

step 401: respectively performing convolution operations on multiple symbols taking a symbol to be encoded as a center by using multiple mask convolution layers of different scales;

step 402: calculating a probability model of the symbols to be encoded by using a probability network according to calculation results of the multiple mask convolution layers of different scales; and step 403: calculating the probabilities of the symbols to be encoded according to the probability model.

In an embodiment, contents of step 401 are as described in FIGS. 2 and 3A-3C, which are incorporated herein, and shall not be described herein any further.

In an embodiment, in step 402, the probability model may be calculated by using any probability network. For example, a Gaussian probability network, and a Laplacian probability network, etc., may be employed. Taking the Gaussian probability network as an example, in step 402, a mean value and variance or a standard deviation of Gaussian distribution may be estimated according to calculation results of multiple mask convolution layers of different scales, thereby obtaining a Gaussian probability model.

In an embodiment, in step 403, the probabilities of the symbols to be encoded are calculated according to the probability model determined in step 402. For example, taking the Gaussian probability model as an example, the probabilities of the symbols to be encoded may be determined according to symbol values of the symbols to be encoded, the mean value and variance of the Gaussian distribution.

Figure 5:
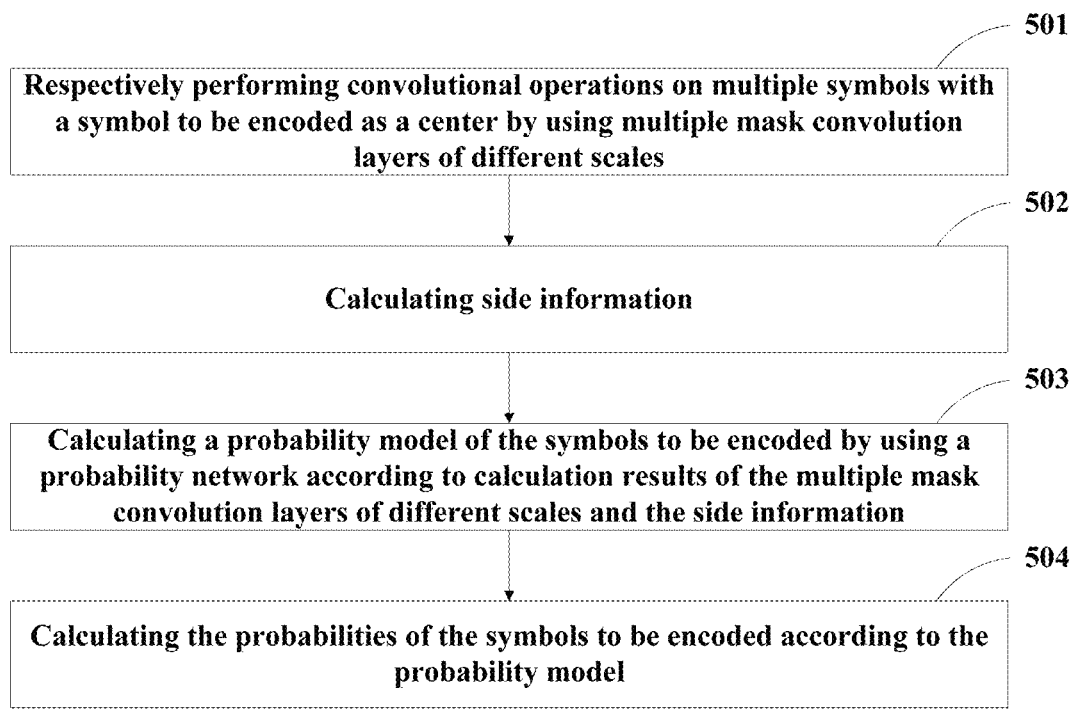
FIG. 5 is another schematic diagram of the method for estimating probabilities of symbols to be encoded of Embodiment 1.

FIG. 5 is another schematic diagram of the method for estimating probabilities of symbols to be encoded of an embodiment. As shown in FIG. 5, the method includes:

step 501: respectively performing convolutional operations on multiple symbols with a symbol to be encoded as a center by using multiple mask convolution layers of different scales;

step 502: calculating side information;

step 503: calculating a probability model of the symbols to be encoded by using a probability network according to calculation results of the multiple mask convolution layers of different scales and the side information; and step 504: calculating the probabilities of the symbols to be encoded according to the probability model.

In an embodiment, the side information may be information related to the symbols to be encoded. As the information related to the symbols to be encoded is considered in the probability estimation, the probabilities of the symbols to be encoded may be estimated more accurately.

In an embodiment, steps 501 and 504 are similar to steps 401 and 403, the contents of which being incorporated herein, which shall not be described herein any further.

In an embodiment, the order of step 501 and step 502 may be arbitrary. For example, step 501 may be performed first, or step 502 may be performed first, or the two steps may be performed in parallel.

Figure 6:
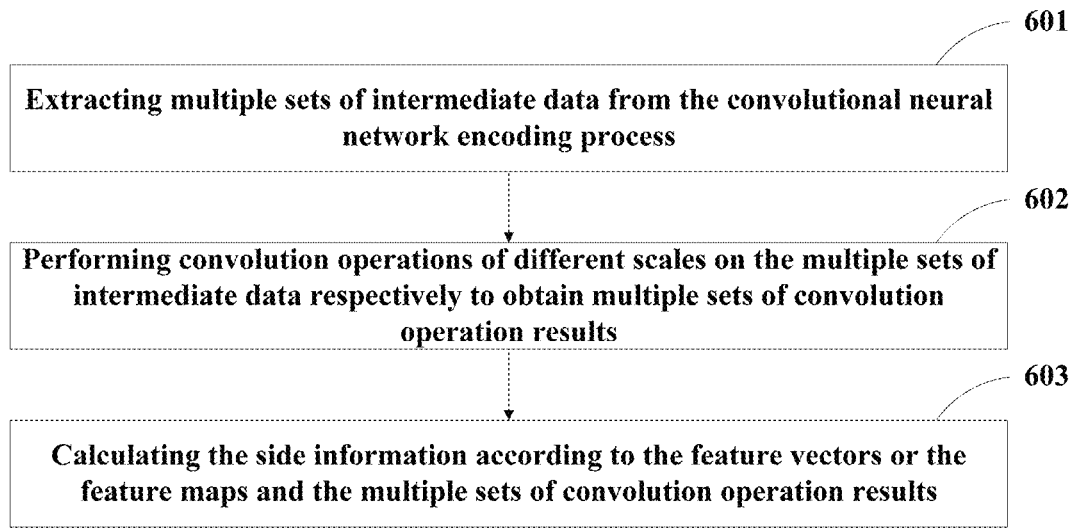
FIG. 6 is a schematic diagram of a method for calculating side information of Embodiment 1.

In an embodiment, in step 502, the side information may be calculated in any manner. A method for calculating the side information shall be exemplarily described below with reference to FIG. 6. FIG. 6 is a schematic diagram of the method for calculating the side information of this embodiment. As shown in FIG. 6, the method includes:

step 601: extracting multiple sets of intermediate data from the convolutional neural network encoding process;

step 602: performing convolution operations of different scales on the multiple sets of intermediate data respectively to obtain multiple sets of convolution operation results; and step 603: calculating the side information according to the feature vectors or the feature maps and the multiple sets of convolution operation results.

In an embodiment, the multiple sets of intermediate data are extracted from the process of performing convolutional neural network encoding on the image data to generate feature vectors or feature maps of the image data, the multiple sets of intermediate data including information related to the feature vectors or the feature maps of the image data. By performing convolution operations of different scales on the multiple sets of intermediate data to obtain multiple sets of convolution operation results, and calculating the side information according to the convolution operation result and the feature vectors or the feature maps, the information related to the feature vectors or the feature maps may be fully utilized, whereby more accurate side information may be provided for the probability estimation of the symbols to be encoded.

In an embodiment, in step 601, when extracting multiple sets of intermediate data from the convolutional neural network encoding process, an arbitrary number of intermediate data may be extracted. For example, three sets of intermediate data may be extracted.

In an embodiment, in step 602, in performing convolution operations of different scales on the multiple sets of intermediate data, the scales of the convolution operations may be set arbitrarily. For example, taking three sets of intermediate data as an example, the scales of the convolution operations may be set to be 5*5, 7*7, and 9*9. By using the above convolution operations of larger scales, it is possible to contain a wider range of intermediate data information, and by using convolution operations of different scales, it is possible to consider different ranges of intermediate data information, that is, high-frequency information and low-frequency information may be included, whereby the side information may be estimated more accurately.

In an embodiment, in step 104, the entropy encoding is encoding in an encoding process losing no information according to an entropy principle. In performing entropy encoding, the more accurate a probability of occurrence of each symbol to be encoded, the fewer bits may be used to denote the symbol to be encoded. In step 104, any entropy encoding may be employed, for example, Shannon encoding, Huffman encoding, and arithmetic encoding, etc.

Figure 7:
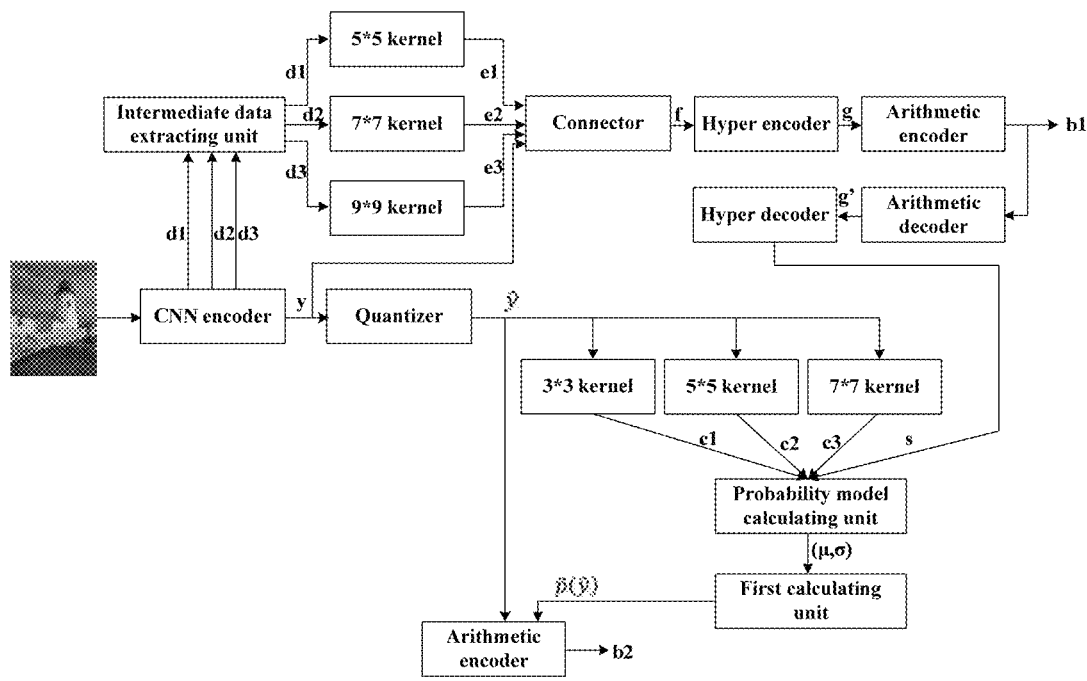
FIG. 7 is a schematic diagram of a structure of the image encoding apparatus of Embodiment 1.

FIG. 7 is a schematic diagram of a structure of an image encoding apparatus. The image encoding method of this embodiment shall be illustrated below with reference to FIG. 7.

As shown in FIG. 7, first, convolutional neural network encoding is performed on the image data to be processed by the convolutional neural network encoder to obtain a latent representation y (i.e. a feature vector or a feature map) of the image data; the latent representation y is quantized by the quantizer to obtain a discrete latent representation $\hat{y}$ (i.e. the symbol to be encoded); the discrete latent representation $\hat{y}$ is respectively passed through a 3*3 convolution kernel, a 5*5 convolution kernel and a 7*7 convolution kernel to obtain results c1, c2, and c3 after the convolution operations; according to the results c1, c2, and c3 after the convolution operations and the side information s, the probability model of the symbol to be encoded is obtained by calculating by the probability model calculating unit, taking the Gaussian distribution as an example, the probability model including a mean value μ and a standard deviation a of the Gaussian distribution; according to symbol values and the probability model of the symbols to be encoded, the probabilities p̃(ŷ) of the symbols to be encoded are calculated by a first calculating unit; and according to the probabilities p̃(ŷ) and the latent representation ŷ, entropy encoding is performed by an arithmetic encoder to generate a code stream b2 denoting the image data.

The side information s may be generated in a manner as below: extracting three sets of intermediate data d1, d2 and d3 from the convolutional neural network encoder by an intermediate data extracting unit; performing convolution operation on the intermediate data d1 by using the 5*5 convolution kernel, performing convolution operation on the intermediate data d2 by using the 7*7 convolution kernel, and performing convolution operation on the intermediate data d3 by using the 9*9 convolution kernel, so as to respectively obtain the results e1, e2 and e3 after the convolution operations; connecting the results e1, e2 and e3 after the convolution operations and the latent representation y by a connector to obtain connection data f; performing hyper encoding on the connection data f by a hyper encoder to generate hyper encoded data g; performing arithmetic encoding on the hyper encoded data g by an arithmetic encoder to generate a code stream b1 indicating side information; performing arithmetic decoding on the code stream b1 by an arithmetic decoder to generate decoded data g'; and performing hyper decoding on the decoded data g' by a hyper decoder to obtain the side information s.

In an embodiment, the code stream b1 denoting the side information and the code stream b2 denoting the image data may be used for network transmission or storage. At the decoder side, the side information may be obtained by correspondingly decoding the code stream b1, and image data may be reconstructed by correspondingly decoding the code stream b2.

In an embodiment, forms of hyper encoding and hyper decoding and arithmetic coding and arithmetic decoding are employed in generating the side information s. However, this disclosure is not limited thereto, and other encoding and decoding forms may also be used to generate the side information.

In the embodiments, by estimating probabilities of symbols to be encoded by using a multi-scale context model, accuracy of probability estimation of the symbols to be encoded may be improved, and by performing entropy encoding on the symbols to be encoded according to the probabilities, the image data may be denoted by using relatively few bits, thereby improving encoding efficiency of the image encoding.

Embodiment 2

Figure 8:
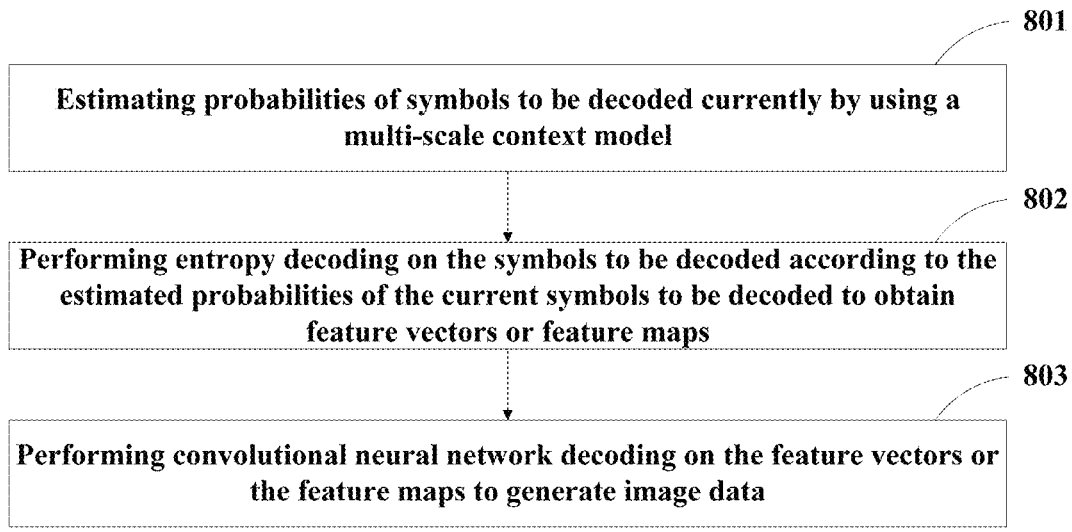
FIG. 8 is a schematic diagram of the image decoding method of Embodiment 2.

Embodiment 2 provides an image decoding method. FIG. 8 is a schematic diagram of the image decoding method of an embodiment. As shown in FIG. 8, the method includes:

step 801: estimating probabilities of symbols to be decoded currently by using a multi-scale context model; the multi-scale context model includes multiple mask convolution layers of different scales;

step 802: performing entropy decoding on the symbols to be decoded according to the estimated probabilities of the current symbols to be decoded to obtain feature vectors or feature maps; and step 803: performing convolutional neural network decoding on the feature vectors or the feature maps to generate image data.

In an embodiment, by estimating probabilities of the symbols to be decoded by using a multi-scale context model, accuracy of probability estimation of the symbols to be decoded may be improved, and by performing entropy decoding on the symbols to be decoded according to the probabilities, decoding accuracy of the images may be improved.

In an embodiment, in step 801, in estimating the probabilities by using the multi-scale context model, the estimation may be performed in a point-by-point manner according to an order of the symbols to be decoded; the estimated probabilities of the symbols to be decoded are dependent on information of decoded symbols preceding the symbols to be decoded.

In an embodiment, the multi-scale context model may be of any structure. For example, the multi-scale context model may include multiple mask convolution layers of different scales. The mask convolution layers may be used to perform convolution operations on multiple symbols taking a symbol to be decoded as a center; a weight of the decoded symbols preceding the symbol to be decoded is set to be 1, and a weight of un-decoded symbols following the symbol to be decoded is set to be 0.

A method for estimating the probabilities of the symbols to be decoded by using multiple mask convolution layers of different scales shall be described below with reference to FIGS. 2 and 3A-3C.

FIG. 2 is a schematic diagram of a feature map of an embodiment. For the convenience of description, a feature map of 15*10 is exemplarily used in FIG. 2. However, it may be understood that the feature map may also be of other sizes, which is not limited in this disclosure. As shown in FIG. 2, in the feature map, each rectangle denotes a discrete symbol to be decoded, the rectangle in dotted lines corresponds to an decoded symbol, the rectangle D corresponds to a current symbol to be decoded needing to be estimated with respect to probability, and probability estimation is performed on the symbols to be decoded one by one in a direction indicated by the arrow.

In an embodiment, any number of mask convolution layers of different scales may be used in the multi-scale context model; the scales of the mask convolution layers may be any scales. FIGS. 3A-3C are schematic diagrams of multiple mask convolution layers of different scales of the embodiments. In the embodiments, as shown in FIGS. 3A-3C, three mask convolution layers of different scales may be used in the multi-scale context model; the scales of the mask convolution layers may be 3*3, 5*5 and 7*7, respectively. The 3*3 mask convolution layer shown in FIG. 3A corresponds to the rectangle A in FIG. 2, the 5*5 mask convolution layer shown in FIG. 3B corresponds to the rectangle B in FIG. 2, the 7*7 mask convolutional layer shown in FIG. 3C corresponds to the rectangle C in FIG. 2. The rectangle 301 in FIG. 3A, the rectangle 302 in FIG. 3B and the rectangle 303 in FIG. 3C may correspond to the rectangle D in FIG. 2, i.e. the current symbol to be decoded. As shown in FIGS. 2 and 3A-3C, a weight of the decoded symbols preceding the symbol to be decoded is set to be 1, and a weight of the un-decoded symbols following the symbol to be decoded is set to be 0. Hence, the probability of the current symbol to be decoded may be estimated according to the preceding decoded symbol.

In an embodiment, the probability of the current symbol to be decoded is estimated according to the preceding decoded symbols, that is, the correlation between the preceding decoded symbols and the symbol to be decoded needs to be taken into account in estimating the probability of the current symbol to be decoded. The correlation between the preceding decoded symbols and the current symbol to be decoded may possibly be different due to different image data or different regions in the same image data. Therefore, in an embodiment, by providing multiple mask convolution layers of different scales, not only the preceding decoded symbols relatively far away from the current symbol to be decoded but also the preceding decoded symbols relatively close to the current symbol to be decoded may be taken into account. Thus, the preceding information may be fully utilized, thereby accurately estimating the probabilities of the symbols to be decoded.

In an embodiment, in step 801, in estimating the probabilities of the symbols to be decoded by using the multi-scale context model, the probability estimation may be performed according to the operation results of the multiple mask convolution layers of different scales, or the probability estimation may be performed according to the operation results of the multiple mask convolution layers of different scales and the side information. Step 801 shall be exemplarily described below with reference to FIGS. 9A and 9B.

Figure 9A:
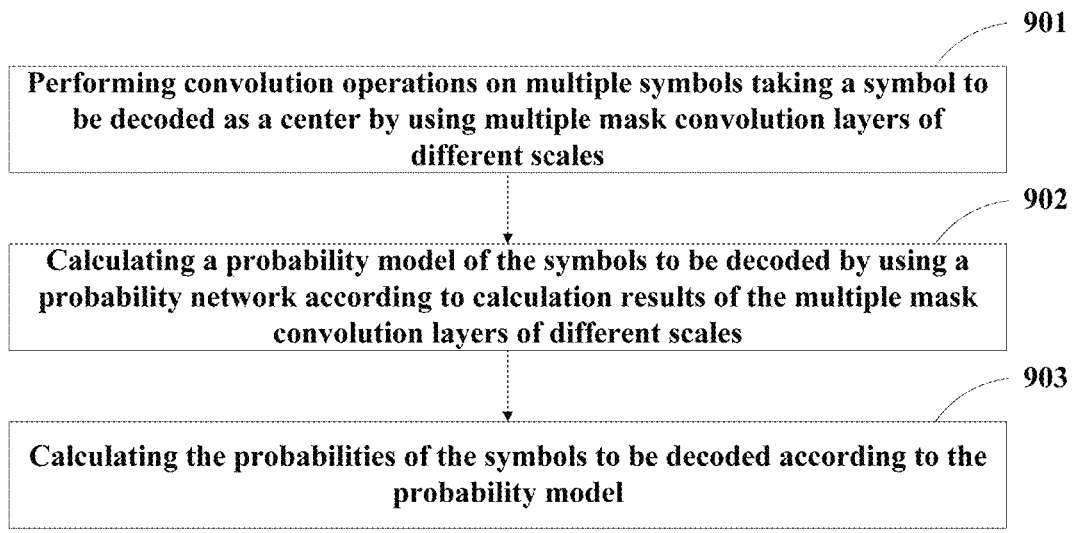
FIG. 9A is a schematic diagram of a method for estimating probabilities of symbols to be decoded of Embodiment 2.

FIG. 9A is a schematic diagram of a method for estimating probabilities of symbols to be decoded of this embodiment. As shown in FIG. 9A, the method includes:

step 901: respectively performing convolution operations on multiple symbols taking a symbol to be decoded as a center by using multiple mask convolution layers of different scales;

step 902: calculating a probability model of the symbols to be decoded by using a probability network according to calculation results of the multiple mask convolution layers of different scales; and step 903: calculating the probabilities of the symbols to be decoded according to the probability model.

In an embodiment, contents of step 901 are as described in FIGS. 2 and 3A-3C, which are incorporated herein, and shall not be described herein any further.

In an embodiment, in step 902, the probability model may be calculated by using any probability network. For example, a Gaussian probability network, and a Laplacian probability network, etc., may be employed. Taking the Gaussian probability network as an example, in step 902, a mean value and variance or a standard deviation of Gaussian distribution may be estimated according to calculation results of multiple mask convolution layers of different scales, thereby obtaining a Gaussian probability model.

In an embodiment, in step 903, the probabilities of the symbols to be decoded are calculated according to the probability model determined in step 902. For example, taking the Gaussian probability model as an example, the probabilities of the symbols to be decoded may be determined according to symbol values of the symbols to be decoded and the mean value and variance of the Gaussian distribution.

Figure 9B:
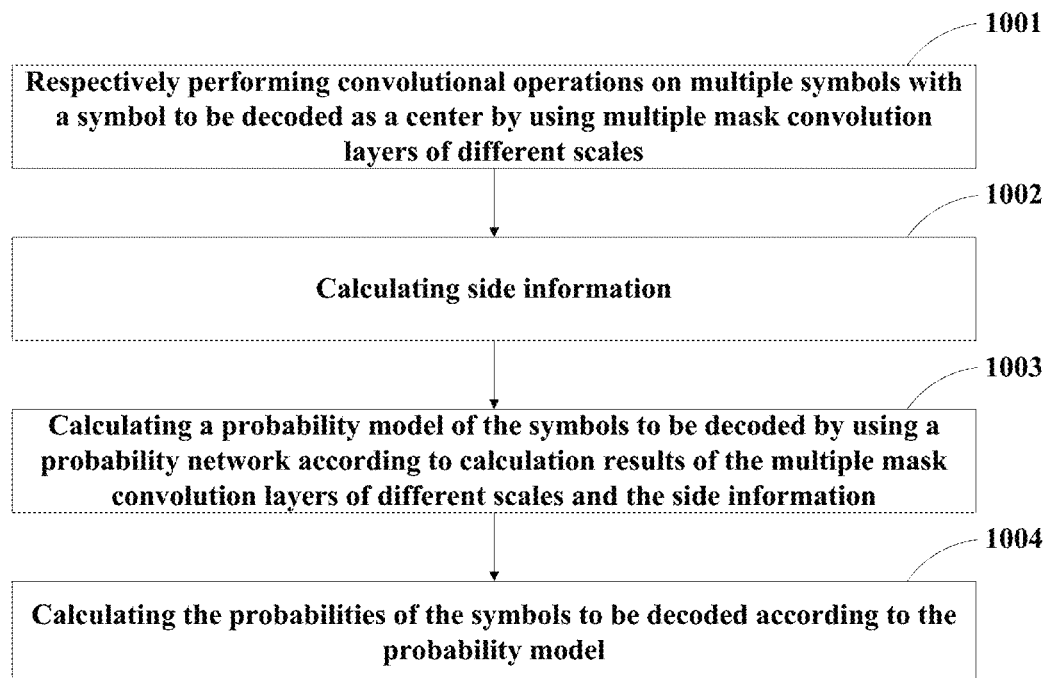
FIG. 9B is another schematic diagram of the method for estimating probabilities of symbols to be decoded of Embodiment 2.

FIG. 9B is another schematic diagram of the method for estimating probabilities of symbols to be decoded of this embodiment. As shown in FIG. 9B, the method includes:

step 1001: respectively performing convolutional operations on multiple symbols with a symbol to be decoded as a center by using multiple mask convolution layers of different scales;

step 1002: calculating side information;

step 1003: calculating a probability model of the symbols to be decoded by using a probability network according to calculation results of the multiple mask convolution layers of different scales and the side information; and step 1004: calculating the probabilities of the symbols to be decoded according to the probability model.

In an embodiment, the side information may be information related to the symbols to be decoded. As the side information related to the symbols to be decoded is considered in the probability estimation, the probabilities of the symbols to be decoded may be estimated more accurately.

In an embodiment, steps 1001 and 1004 are similar to steps 901 and 903, the contents of which being incorporated herein, which shall not be described herein any further.

In an embodiment, in step 1002, the side information may be calculated in any manner. For example, hyper decoding may be performed on a received bit stream corresponding to the side information to obtain the side information. However, this disclosure is not limited thereto, and other decoding forms may be employed to generate the side information.

In an embodiment, in step 802, any entropy decoding may be employed, such as decoding to which Shannon encoding, or Huffman encoding, or arithmetic encoding, etc., corresponds.

Figure 10:
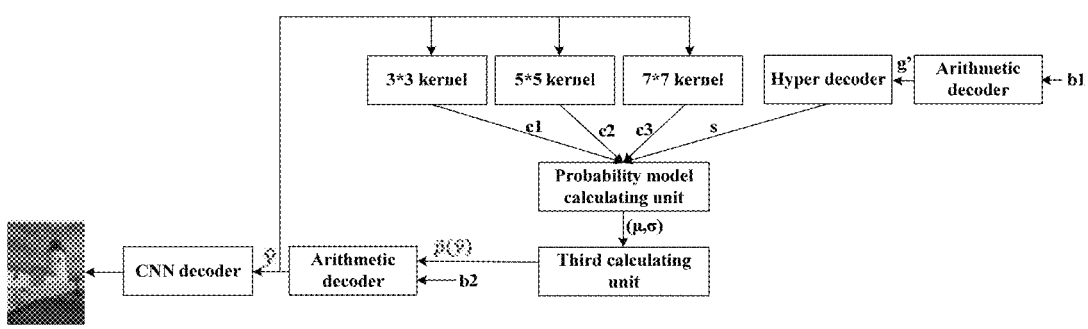
FIG. 10 is a schematic diagram of a structure of the image decoding apparatus of Embodiment 2.

FIG. 10 is a schematic diagram of a structure of an image decoding apparatus. The image decoding method of this embodiment shall be illustrated below with reference to FIG. 10.

As shown in FIG. 10, first, entropy decoding is performed on code stream b2 denoting image data by the arithmetic decoder to obtain a discrete latent representation $\hat{y}$ (i.e. a feature vector or a feature map); and the discrete latent representation $\hat{y}$ is decoded by a convolutional neural network decoder to reconstruct the image data.

In performing the entropy decoding by the arithmetic decoder, a probability of a current latent representation $\hat{y}$ needs to be used. The probability may be calculated in a manner as below that: the discrete latent representation $\hat{y}$ is respectively passed through a 3*3 convolution kernel, a 5*5 convolution kernel and a 7*7 convolution kernel to obtain results c1, c2, and c3 after the convolution operations; according to the results c1, c2, and c3 after the convolution operations and the side information s, the probability model of the symbol to be decoded is obtained by calculating by a probability model calculating unit, taking the Gaussian distribution as an example, the probability model including a mean value μ and a standard deviation σ of the Gaussian distribution; according to the code stream b2 and the probability model, the probabilities $\tilde{p}(\hat{y})$ of the symbols to be decoded are calculated by a third calculating unit.

The side information s may be generated in a manner as below: performing arithmetic decoding on the code stream b1 indicating side information by the arithmetic decoder to generate decoded data g'; and performing hyper decoding on the decoded data g' by a hyper decoder to obtain the side information s.

In an embodiment, as shown in FIG. 10, $\hat{y}$ is used as the input of the CNN decoder. In addition, μ which is predicted by the probability model may be used as part of the input of the CNN decoder. For example, in model prediction, μ may be predicted infinitely approach to $\hat{y}$, and μ is a complement to $\hat{y}$; μ and $\hat{y}$ may be used together (for example concat) as the input of the CNN decoder, thereby a better image may be reconstructed in a certain extent.

In an embodiment, forms of hyper decoding and arithmetic decoding are employed in generating the side information s. However, this disclosure is not limited thereto, and other decoding forms may also be used to generate the side information.

In the embodiments, by estimating probabilities of symbols to be decoded by using a multi-scale context model, accuracy of probability estimation of the symbols to be decoded may be improved, and by performing entropy decoding on the symbols to be decoded according to the probabilities, decoding accuracy of the images may be improved.

Embodiment 3

Embodiment 3 provides an image encoding apparatus. As a principle of the apparatus for solving problems is similar to that of the method in Embodiment 1, reference may be made to the implementation of the method in Embodiment 1 for implementation of the apparatus, with identical contents being not going to be described herein any further.

Figure 11:
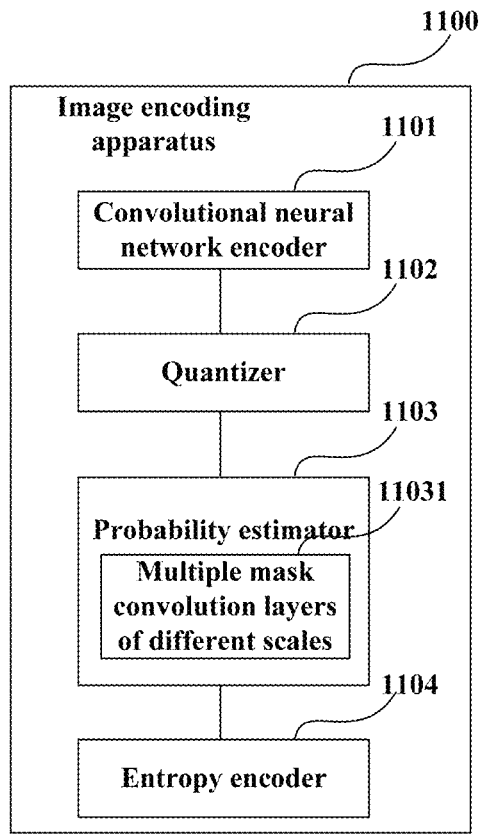
FIG. 11 is a schematic diagram of a structure of the image encoding apparatus of Embodiment 3.

FIG. 11 is a schematic diagram of a structure of the image encoding apparatus 1100. As shown in FIG. 11, the apparatus 1100 includes:
- a convolutional neural network encoder 1101 configured to encode image data to be processed by using a convolutional neural network to generate feature vectors or feature maps of the image data;
- a quantizer 1102 configured to quantize the feature vectors or feature maps to generate discrete symbols to be encoded;
- a probability estimator 1103 configured to estimate probabilities of the symbols to be encoded by using a multi-scale context model; the probability estimator 1103 comprises multiple mask convolution layers 11031 of different scales; and
- an entropy encoder 1104 configured to perform entropy encoding according to the probabilities of the symbols to be encoded.

In an embodiment, reference may be made to steps 101-104 in Embodiment 1 for implementations of the convolutional neural network encoder 1101, the quantizer 1102, the probability estimator 1103 and the entropy encoder 1104, which shall not be described herein any further.

In an embodiment, by estimating probabilities of symbols to be encoded by using a multi-scale context model, accuracy of probability estimation of the symbols to be encoded may be improved, and by performing entropy encoding on the symbols to be encoded according to the probabilities, the image data may be denoted by using relatively few bits, thereby improving encoding efficiency of the image encoding.

Figure 12:
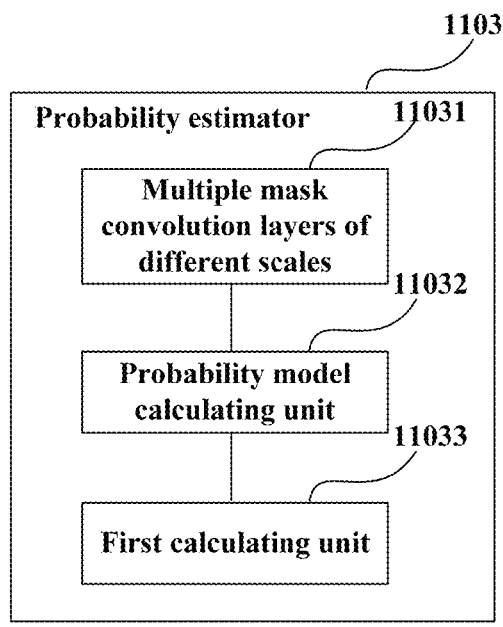
FIG. 12 is a schematic diagram of a structure of the probability estimator of Embodiment 3.

FIG. 12 is a schematic diagram of a structure of the probability estimator 1103 of this embodiment. As shown in FIG. 12, the probability estimator 1103 may include:
- multiple mask convolution layers 11031 of different scales configured to respectively perform convolutional operations on multiple symbols with a symbol to be encoded as a center;
- a probability model calculating unit 11032 configured to calculate a probability model of the symbols to be encoded by using a probability network according to calculation results of the multiple mask convolution layers 11031 of different scales; and
- a first calculating unit 11033 configured to calculate the probabilities of the symbols to be encoded according to the probability model.

In an embodiment, reference may be made to steps 401-403 in Embodiment 1 for implementations of the multiple mask convolution layers 11031, the probability model calculating unit 11032 and the first calculating unit 11033, which shall not be described herein any further.

Figure 13:
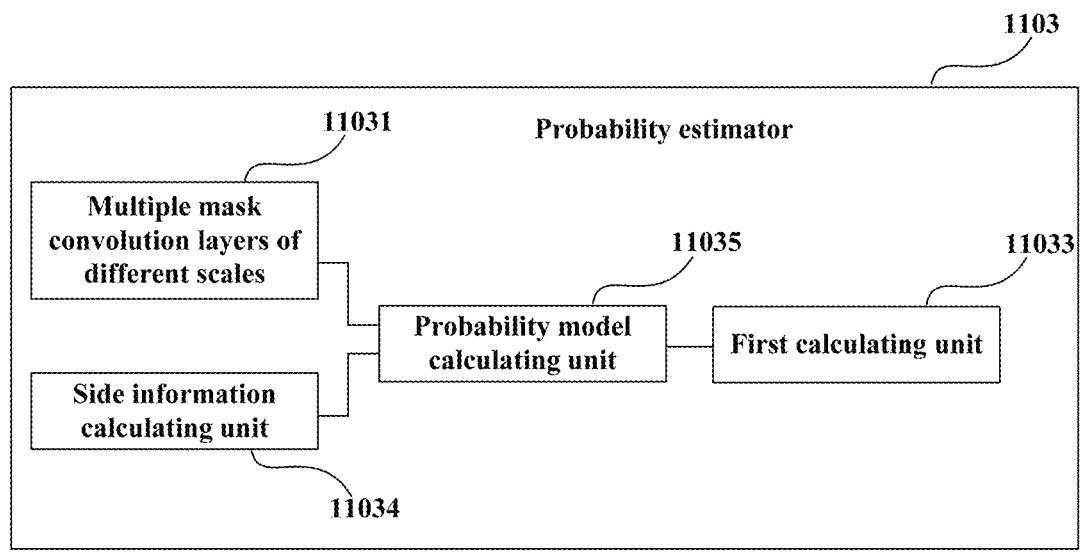
FIG. 13 is another schematic diagram of the structure of the probability estimator of Embodiment 3.

FIG. 13 is another schematic diagram of the structure of the probability estimator 1103 of this embodiment. As shown in FIG. 13, the probability estimator 1103 may include:
- a side information calculating unit 11034 configured to calculate side information;
- multiple mask convolution layers 11031 of different scales configured to respectively perform convolutional operations on multiple symbols with a symbol to be encoded as a center;
- a probability model calculating unit 11035 configured to calculate a probability model of the symbols to be encoded by using a probability network according to calculation results of the multiple mask convolution layers of different scales and the side information; and
- a first calculating unit 11033 configured to calculate the probabilities of the symbols to be encoded according to the probability model.

In an embodiment, reference may be made to steps 501-504 in Embodiment 1 for implementations of the multiple mask convolution layers 11031, the side information calculating unit 11034, the probability model calculating unit 11035 and the first calculating unit 11033, which shall not be described herein any further.

Figure 14:
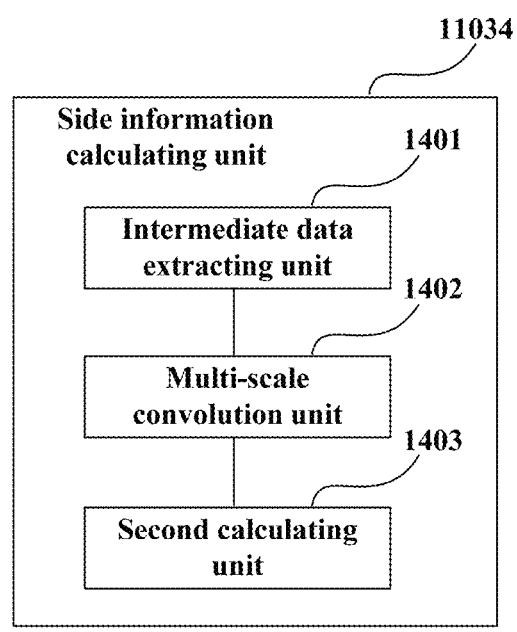
FIG. 14 is a schematic diagram of a structure of the side information calculating unit of Embodiment 3.

FIG. 14 is a schematic diagram of a structure of the side information calculating unit 11034 of Embodiment. As shown in FIG. 14, the side information calculating unit 11034 may include:
- an intermediate data extracting unit 1401 configured to extract multiple sets of intermediate data from the convolutional neural network encoder;
- a multi-scale convolution unit 1402 configured to perform convolution operations of different scales on the multiple sets of intermediate data respectively to obtain multiple sets of convolution operation results; and
- a second calculating unit 1403 configured to calculate the side information according to the feature vectors or the feature maps and the multiple sets of convolution operation results.

In an embodiment, reference may be made to steps 601-603 in Embodiment 1 for implementations of the intermediate data extracting unit 1401, the multi-scale convolution unit 1402 and the second calculating unit 1403, which shall not be described herein any further.

In the embodiments, by estimating probabilities of symbols to be encoded by using a multi-scale context model, accuracy of probability estimation of the symbols to be encoded may be improved, and by performing entropy encoding on the symbols to be encoded according to the probabilities, the image data may be denoted by using relatively few bits, thereby improving encoding efficiency of the image encoding.

Embodiment 4

Embodiment 4 provides an image decoding apparatus. As a principle of the apparatus for solving problems is similar to that of the method in Embodiment 2, reference may be made to the implementation of the method in Embodiment 2 for implementation of the apparatus, with identical contents being not going to be described herein any further.

Figure 15:
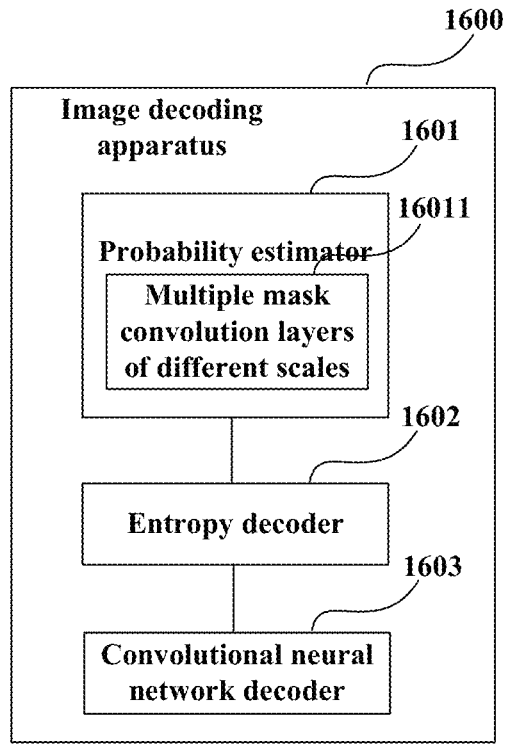
FIG. 15 is a schematic diagram of a structure of the image decoding apparatus of Embodiment 4.

FIG. 15 is a schematic diagram of a structure of the image decoding apparatus. As shown in FIG. 15, the apparatus 1600 includes:
- a probability estimator 1601 configured to estimate probabilities of symbols to be decoded currently by using a multi-scale context model; the probability estimator 1601 includes multiple mask convolution layers 16011 of different scales;

an entropy decoder 1602 configured to perform entropy decoding on the symbols to be decoded according to the probabilities to obtain feature vectors or feature maps; and a convolutional neural network decoder 1603 configured to decode the feature vectors or the feature maps to generate image data.

In an embodiment, by estimating probabilities of the symbols to be decoded by using a multi-scale context model, accuracy of probability estimation of the symbols to be decoded may be improved, and by performing entropy decoding on the symbols to be decoded according to the probabilities, decoding accuracy of the images may be improved.

In an embodiment, reference may be made to steps 801-803 in Embodiment 2 for implementations of the probability estimator 1601, the entropy decoder 1602 and the convolutional neural network decoder 1603, which shall not be described herein any further.

Figure 16:
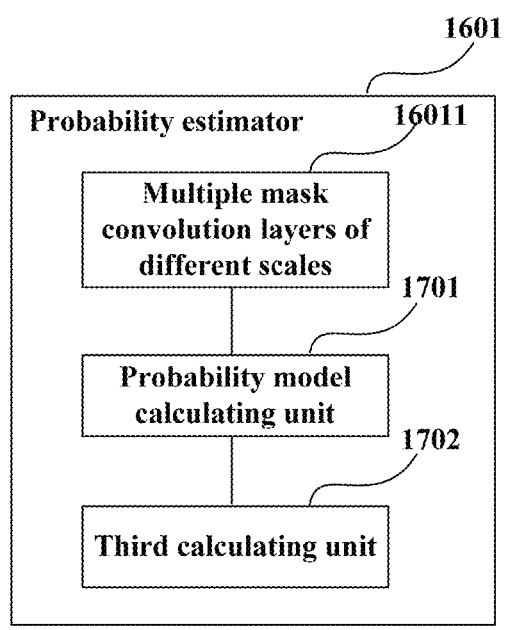
FIG. 16 is a schematic diagram of a structure of the probability estimator of Embodiment 4.

FIG. 16 is a schematic diagram of a structure of the probability estimator 1601 of this embodiment. As shown in FIG. 16, the probability estimator 1601 includes:

multiple mask convolution layers 16011 of different scales configured to respectively perform convolutional operations on multiple symbols with a symbol to be decoded as a center;

a probability model calculating unit 1701 configured to calculate a probability model of the probabilities of symbols to be decoded by using a probability network according to calculation results of the mask convolution layers; and a third calculating unit 1702 configured to calculate the probabilities of the symbols to be decoded according to the probability model.

In an embodiment, reference may be made to steps 901-903 in Embodiment 2 for implementations of the multiple mask convolution layers 16011, the probability model calculating unit 1701 and the third calculating unit 1702, which shall not be described herein any further.

Figure 17:
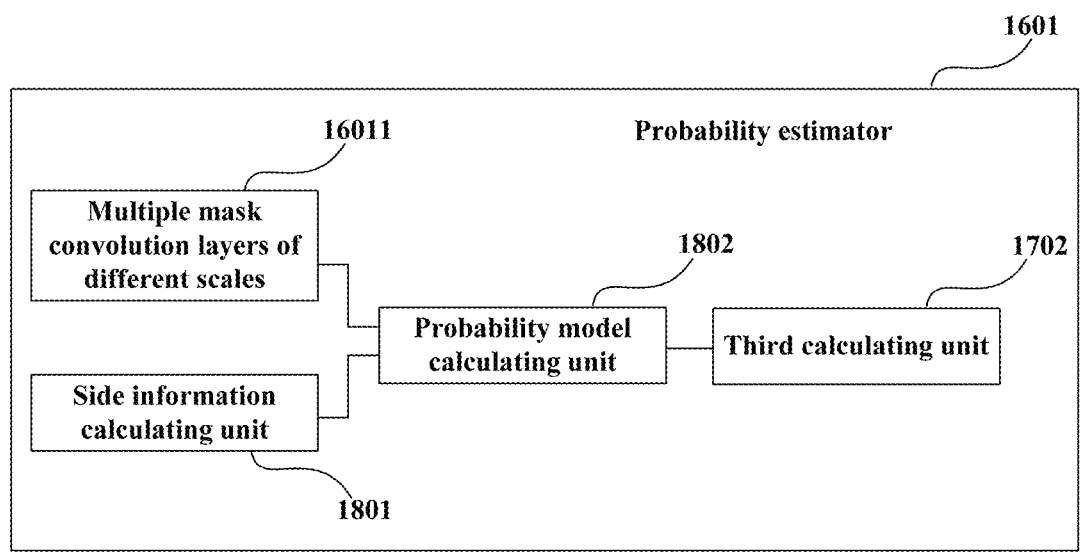
FIG. 17 is another schematic diagram of the structure of the probability estimator of Embodiment 4.

FIG. 17 is another schematic diagram of a structure of the probability estimator 1601 of this embodiment. As shown in FIG. 17, the probability estimator 1601 includes:

multiple mask convolution layers 16011 of different scales configured to respectively perform convolutional operations on multiple symbols with a symbol to be decoded as a center;

a side information calculating unit 1801 configured to calculate side information;

a probability model calculating unit 1802 configured to calculate a probability model of the symbols to be decoded by using a probability network according to calculation results of the mask convolution layers 16011 of different scales and the side information; and a third calculating unit 1702 configured to calculate the probabilities of the symbols to be decoded according to the probability model.

In an embodiment, reference may be made to steps 1001-1004 in Embodiment 2 for implementations of the multiple mask convolution layers 16011, the side information calculating unit 1801, the probability model calculating unit 1802 and the third calculating unit 1702, which shall not be described herein any further.

In the embodiments, by estimating probabilities of symbols to be decoded by using a multi-scale context model, accuracy of probability estimation of the symbols to be decoded may be improved, and by performing entropy decoding on the symbols to be decoded according to the probabilities, decoding accuracy of the images may be improved.

Embodiment 5

The embodiments of this disclosure provide an electronic device, including the image encoding apparatus described in Embodiment 3 or the image decoding apparatus described in Embodiment 4, with its contents being incorporated herein. The electronic device may be a computer, a server, a working station, a lap-top computer, and a smart mobile phone, etc.; however, the embodiment of this disclosure is not limited thereto.

Figure 18:
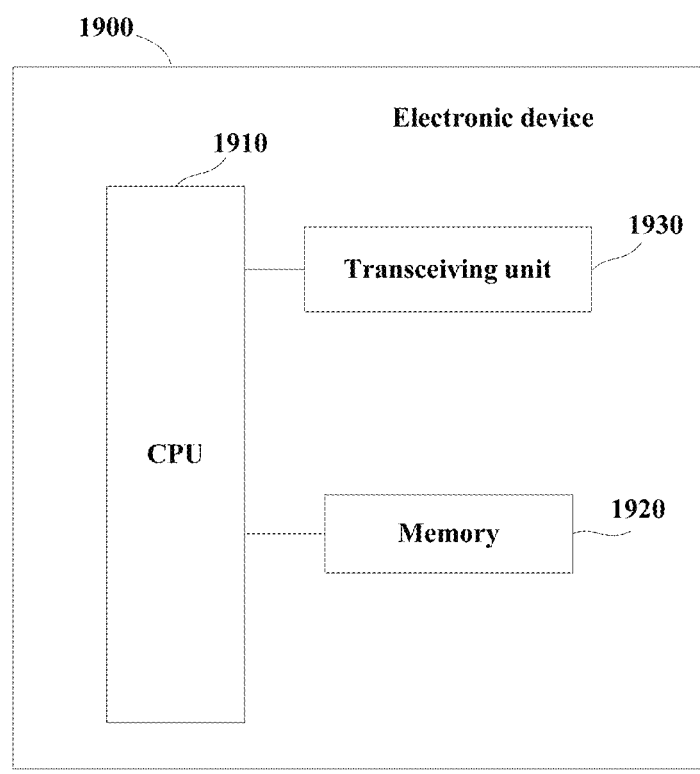
FIG. 18 is a schematic diagram of a structure of the electronic device of Embodiment 5.

FIG. 18 is a schematic diagram of a structure of the electronic device of this embodiment. As shown in FIG. 18, the electronic device 1900 may include a processor (such as a central processing unit (CPU)) 1910 and a memory 1920, the memory 1920 being coupled to the central processing unit 1910. The memory 1920 may store various data, and furthermore, it may store a program for information processing, and execute the program under control of the processor 1910.

In one embodiment, the functions of the image encoding apparatus 1100 or the image decoding apparatus 1600 may be integrated into processor 1910. The processor 1910 may be configured to carry out the image encoding method described in Embodiment 1 or the image decoding method described in Embodiment 2.

In another embodiment, the image encoding apparatus 1100 or the image decoding apparatus 1600 and the processor 1910 may be configured separately. For example, the image encoding apparatus 1100 or the image decoding apparatus 1600 may be configured as a chip connected to the processor 1910, with the functions of the image encoding apparatus 1100 or the image decoding apparatus 1600 being carried out under control of the processor 1910.

For example, the processor 1910 may be configured to perform following control: performing convolutional neural network encoding on image data to be processed to generate feature vectors or feature maps of the image data; quantizing the feature vectors or feature maps to generate discrete symbols to be encoded; estimating probabilities of the symbols to be encoded by using a multi-scale context model; the multi-scale context model comprises multiple mask convolution layers of different scales; and performing entropy encoding according to the probabilities of the symbols to be encoded.

Or, for example, the processor 1910 may be configured to perform following control: estimating probabilities of symbols to be decoded currently by using a multi-scale context model; the multi-scale context model comprises multiple mask convolution layers of different scales; performing entropy decoding on the symbols to be decoded according to the probabilities to obtain feature vectors or feature maps; and performing convolutional neural network decoding on the feature vectors or the feature maps to generate image data.

Reference may be made to Embodiment 1 or 2 for a particular implementation of the processor 1910, which shall not be described herein any further.

Furthermore, as shown in FIG. 18, the electronic device 1900 may include a transceiving unit 1930, etc. Functions of the above components are similar to those in the prior art, and shall not be described herein any further. It should be noted that the electronic device 1900 does not necessarily include all the parts shown in FIG. 19, and furthermore, the electronic device 1900 may include parts not shown in FIG. 19, and the relevant art may be referred to.

An embodiment of the present disclosure provides a computer readable program code, which, when executed in an image encoding apparatus, will cause a computer to carry out the image encoding method described in Embodiment 1 in the image encoding apparatus.

An embodiment of the present disclosure provides a computer readable medium, including a computer readable program code, which will cause a computer to carry out the image encoding method described in Embodiment 1 in an image encoding apparatus.

An embodiment of the present disclosure provides a computer readable program code, which, when executed in an image decoding apparatus, will cause a computer to carry out the image decoding method described in Embodiment 2 in the image decoding apparatus.

An embodiment of the present disclosure provides a computer readable medium, including a computer readable program code, which will cause a computer to carry out the image decoding method described in Embodiment 2 in an image decoding apparatus.

The image encoding method in the image encoding apparatus or the image decoding method in the image decoding apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 7 and 10-17 may either correspond to software modules of procedures of a computer program, or correspond to hardware modules. Such software modules may respectively correspond to the steps shown in FIGS. 1, 4-6 and 8-9B. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of an image encoding apparatus or an image decoding apparatus, and may also be stored in a memory card of a pluggable image encoding apparatus or image decoding apparatus.

One or more functional blocks and/or one or more combinations of the functional blocks in FIGS. 1, 4-6 and 8-9B may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 1, 4-6 and 8-9B may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For implementations of this disclosure containing the above embodiments, following supplements are further disclosed.

According to an aspect of an embodiment, an image encoding method, including: performing convolutional neural network encoding on image data to be processed to generate feature vectors or feature maps of the image data; quantizing the feature vectors or feature maps to generate discrete symbols to be encoded; estimating probabilities of the symbols to be encoded by using a multi-scale context model; wherein the multi-scale context model comprises multiple mask convolution layers of different scales; and performing entropy encoding according to the probabilities of the symbols to be encoded.

The estimating probabilities of the symbols to be encoded by using a multi-scale context model includes: performing convolution operations on multiple symbols taking a symbol to be encoded as a center by using multiple mask convolution layers of different scales; calculating a probability model of the symbols to be encoded by using a probability network according to calculation results of the multiple mask convolution layers of different scales; and calculating the probabilities of the symbols to be encoded according to the probability model.

The estimating probabilities of the symbols to be encoded by using a multi-scale context model includes: respectively performing convolutional operations on multiple symbols with a symbol to be encoded as a center by using multiple mask convolution layers of different scales; calculating side information; calculating a probability model of the symbols to be encoded by using a probability network according to calculation results of the multiple mask convolution layers of different scales and the side information; and calculating the probabilities of the symbols to be encoded according to the probability model.

The calculating side information includes: extracting multiple sets of intermediate data from the convolutional neural network encoding process; performing convolution operations of different scales on the multiple sets of intermediate data respectively to obtain multiple sets of convolution operation results; and calculating the side information according to the feature vectors or the feature maps and the multiple sets of convolution operation results.

The intermediate data are of three groups, and the scales of the multiple sets of convolution operations are 5*5, 7*7, and 9*9, respectively.

The mask convolution layers are used to perform convolution operations on multiple symbols taking a symbol to be encoded as a center; wherein a weight of encoded symbols preceding the symbols to be encoded is set to be 1, and a weight of un-encoded symbols following the symbols to be encoded is set to be 0.

The number of the mask convolution layers is 3, and sizes of the mask convolution layers are 3*3, 5*5 and 7*7, respectively.

According to an aspect of an embodiment, and image decoding method, includes estimating probabilities of symbols to be decoded currently by using a multi-scale context model; wherein the multi-scale context model comprises multiple mask convolution layers of different scales; performing entropy decoding on the symbols to be decoded according to the probabilities to obtain feature vectors or feature maps; and performing convolutional neural network decoding on the feature vectors or the feature maps to generate image data.

The estimating probabilities of symbols to be decoded by using a multi-scale context model includes: performing convolution operations on multiple symbols taking a symbol to be decoded as a center by using multiple mask convolution layers of different scales; calculating a probability model of the symbols to be decoded by using a probability network according to calculation results of the multiple mask convolution layers of different scales; and calculating the probabilities of the symbols to be decoded according to the probability model.

The estimating probabilities of symbols to be decoded by using a multi-scale context model includes: respectively performing convolutional operations on multiple symbols with a symbol to be decoded as a center by using multiple mask convolution layers of different scales; calculating side information; calculating a probability model of the symbols to be decoded by using a probability network according to calculation results of the multiple mask convolution layers of different scales and the side information; and calculating the probabilities of the symbols to be decoded according to the probability model.

The mask convolution layers are used to perform convolution operations on multiple symbols taking a symbol to be decoded as a center; wherein a weight of decoded symbols preceding the symbols to be decoded is set to be 1, and a weight of un-decoded symbols following the symbols to be decoded is set to be 0.

The number of the mask convolution layers is 3, and sizes of the mask convolution layers are 3*3, 5*5 and 7*7, respectively.

According to an aspect of an embodiment, an image encoding apparatus, including: a convolutional neural network encoder configured to encode image data to be processed by using a convolutional neural network to generate feature vectors or feature maps of the image data; a quantizer configured to quantize the feature vectors or feature maps to generate discrete symbols to be encoded; a probability estimator configured to estimate probabilities of the symbols to be encoded by using a multi-scale context model; wherein the probability estimator comprises multiple mask convolution layers of different scales; and an entropy encoder configured to perform entropy encoding according to the probabilities of the symbols to be encoded.

The multiple mask convolution layers of different scales respectively perform convolutional operations on multiple symbols with a symbol to be encoded as a center; and the probability estimator further includes: a probability model calculating unit configured to calculate a probability model of the symbols to be encoded by using a probability network according to calculation results of the multiple mask convolution layers of different scales; and a first calculating unit configured to calculate the probabilities of the symbols to be encoded according to the probability model.

The multiple mask convolution layers of different scales respectively perform convolutional operations on multiple symbols with a symbol to be encoded as a center; and the probability estimator further includes: a side information calculating unit configured to calculate side information; a probability model calculating unit configured to calculate a probability model of the symbols to be encoded by using a probability network according to calculation results of the multiple mask convolution layers of different scales and the side information; and a first calculating unit configured to calculate the probabilities of the symbols to be encoded according to the probability model.

The side information calculating unit comprises: an intermediate data extracting unit configured to extract multiple sets of intermediate data from the convolutional neural network encoder; a multi-scale convolution unit configured to perform convolution operations of different scales on the multiple sets of intermediate data respectively to obtain multiple sets of convolution operation results; and a second calculating unit configured to calculate the side information according to the feature vectors or the feature maps and the multiple sets of convolution operation results.

the intermediate data are of three sets, and scales of the multi-scale convolution unit are 5×5, 7×7, and 9×9, respectively.

The mask convolution layer is configured to perform convolution operation on the multiple symbols with a symbol to be encoded as a center; wherein a weight of an encoded symbol preceding the symbol to be encoded is set to be 1, and a weight of an unencoded symbol after the symbol to be encoded is set to be 0.

The number of the mask convolution layers is 3, and sizes of the mask convolution layers are 3×3, 5×5, 7×7, respectively.

According to an aspect of an embodiment, an image decoding apparatus, including: a probability estimator configured to estimate probabilities of symbols to be decoded currently by using a multi-scale context model; wherein the probability estimator comprises multiple mask convolution layers of different scales; an entropy decoder configured to perform entropy decoding on the symbols to be decoded according to the probabilities to obtain feature vectors or feature maps; and a convolutional neural network decoder configured to decode the feature vectors or the feature maps to generate image data.

The multiple mask convolution layers of different scales respectively perform convolutional operations on multiple symbols with a symbol to be decoded as a center; and the probability estimator further includes: a probability model calculating unit configured to calculate a probability model of the probabilities of symbols to be decoded by using a probability network according to calculation results of the mask convolution layers; and a third calculating unit configured to calculate the probabilities of the symbols to be decoded according to the probability model.

The multiple mask convolution layers of different scales respectively perform convolutional operations on multiple symbols with a symbol to be decoded as a center; and the probability estimator further comprises: a side information calculating unit configured to calculate side information; a probability model calculating unit configured to calculate a probability model of the symbols to be decoded by using a probability network according to calculation results of the mask convolution layers and the side information; and a third calculating unit configured to calculate the probabilities of the symbols to be decoded according to the probability model.

The mask convolution layer is configured to perform convolution operation on the multiple symbols with a symbol to be decoded as a center; wherein a weight of decoded symbols preceding the symbols to be decoded is set to be 1, and a weight of un-decoded symbols following the symbols to be decoded is set to be 0.

The number of the mask convolution layers is 3, and sizes of the mask convolution layers are 3×3, 5×5, 7×7, respectively.

The invention claimed is:

1. An apparatus, comprising:
a processor to couple to a memory to implement,
an image encoder configured to encode image data to be processed by using a convolutional neural network (CNN) to generate feature vectors or feature maps of the image data;
a quantizer configured to quantize the feature vectors or the feature maps to generate multiple discrete symbols to be encoded;
a probability estimator configured to estimate probabilities of the multiple discrete symbols to be encoded by using a multi-scale context model including multiple mask convolution layers of different scales; and
an entropy encoder configured to perform entropy encoding of the encoded image data according to the probabilities of the discrete symbols to be encoded.

2. The apparatus according to claim 1, wherein,
the multiple mask convolution layers of different scales respectively perform convolutional operations on the multiple discrete symbols with a discrete symbol among the multiple discrete symbols to be encoded as a center; and
the probability estimator is to,
calculate a probability model of the multiple discrete symbols to be encoded by using a probability network according to calculation results of the multiple mask convolution layers of different scales; and
calculate the probabilities of the multiple discrete symbols to be encoded according to the probability model.

3. The apparatus according to claim 1, wherein,
the multiple mask convolution layers of different scales respectively perform convolutional operations on the multiple discrete symbols with a discrete symbol among the multiple discrete symbols to be encoded as a center; and
the probability estimator is to,
calculate side information;
calculate a probability model of the multiple discrete symbols to be encoded by using a probability network according to calculation results of the multiple mask convolution layers of different scales and the side information; and
calculate the probabilities of the multiple discrete symbols to be encoded according to the probability model.

4. The apparatus according to claim 3, wherein to calculate the side information, the probability estimator is to,
extract multiple sets of intermediate data from the image encoder;
using the multiple mask convolution layers to perform convolution operations of the different scales on the multiple sets of intermediate data respectively to obtain multiple sets of convolution operation results; and
calculate the side information according to the feature vectors or the feature maps and the multiple sets of convolution operation results.

5. The apparatus according to claim 4, wherein the multiple sets of intermediate data include three sets of intermediate data, and the different scales of the convolution operations are 5×5, 7×7, and 9×9, respectively.

6. The apparatus according to claim 1,
wherein a mask convolution layer among the mask convolution layers is configured to perform a convolution operation on the multiple discrete symbols with a discrete symbol among the discrete symbols to be encoded as a center; and
wherein a weight of an encoded discrete symbol preceding the discrete symbol to be encoded as the center is set to be 1, and a weight of an unencoded discrete symbol after the discrete symbol to be encoded as the center is set to be 0.

7. The apparatus according to claim 1, wherein a number of the multiple mask convolution layers is 3, and sizes of the multiple mask convolution layers are 3×3, 5×5, 7×7, respectively.

8. An apparatus, comprising:
a processor to couple to a memory to implement,
a probability estimator configured to estimate probabilities of multiple discrete symbols to be decoded currently for entropy encoded image data by using a multi-scale context model including multiple mask convolution layers of different scales;
an entropy decoder configured to perform entropy decoding on the symbols to be decoded for the entropy encoded image data according to the probabilities to obtain feature vectors or feature maps; and
an image decoder configured to decode the feature vectors or the feature maps to generate decoded image data of the entropy encoded image data.

9. The apparatus according to claim 8, wherein,
the multiple mask convolution layers of different scales respectively perform convolutional operations on the multiple discrete symbols with a discrete symbol among the discrete symbols to be decoded as a center;
the probability estimator is to,
calculate a probability model of the probabilities of multiple discrete symbols to be decoded by using a probability network according to calculation results of the mask convolution layers; and
calculate the probabilities of the multiple discrete symbols to be decoded according to the probability model.

10. The apparatus according to claim 8, wherein,
the multiple mask convolution layers of different scales respectively perform convolutional operations on the multiple discrete symbols with a discrete symbol among the multiple discrete symbols to be decoded as a center; and
the probability estimator is to,
calculate side information;
calculate a probability model of the multiple discrete symbols to be decoded by using a probability network according to calculation results of the mask convolution layers and the side information; and
calculate the probabilities of the multiple discrete symbols to be decoded according to the probability model.

* * * * *

(12) SUPPLEMENTAL EXAMINATION CERTIFICATE

United States Patent
Zhou et al.

(10) Number: US 11,468,602 F1
(45) Certificate Issued: Jun. 26, 2023

Control No.: 96/000,432

Filing Date: Apr. 27, 2023

Primary Examiner: Eric B. Kiss

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| US 2018/0173994 | 6/2018 | Rippel |

FOREIGN PATENT DOCUMENTS

| | | |
|---|---|---|
| CN | 106485717 | 3/2017 |

OTHER DOCUMENTS

David Minnen, "Joint Autoregressive and Hierarchical Priors for Learned Image Compression," arxiv.org, Cornell University Library, 201 Olin Library Cornell University Ithaca, NY 14853, XP080914979, September 8, 2018.